US008655889B2

(12) United States Patent
Hua et al.

(10) Patent No.: US 8,655,889 B2
(45) Date of Patent: Feb. 18, 2014

(54) AUTONOMOUS MOBILE BLOGGING

(75) Inventors: Xian-Sheng Hua, Beijing (CN); Hongzhi Li, Beijing (CN); Shipeng Li, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 223 days.

(21) Appl. No.: 12/965,604

(22) Filed: Dec. 10, 2010

(65) Prior Publication Data

US 2012/0150871 A1 Jun. 14, 2012

(51) Int. Cl.
*G06F 7/00* (2006.01)
*G06F 17/30* (2006.01)

(52) U.S. Cl.
USPC .......................................... 707/748; 709/207

(58) Field of Classification Search
None
See application file for complete search history.

(56) References Cited

U.S. PATENT DOCUMENTS

| | | | | |
|---|---|---|---|---|
| 5,959,577 A | * | 9/1999 | Fan et al. | 342/357.42 |
| 6,091,956 A | * | 7/2000 | Hollenberg | 455/456.5 |
| 7,461,033 B1 | * | 12/2008 | McConnell et al. | 706/12 |
| 7,519,658 B1 | | 4/2009 | Anglin et al. | |
| 2003/0236095 A1 | * | 12/2003 | Ross | 455/456.1 |
| 2004/0041926 A1 | * | 3/2004 | Takano et al. | 348/241 |
| 2005/0063563 A1 | * | 3/2005 | Soliman | 382/104 |
| 2005/0064852 A1 | * | 3/2005 | Baldursson | 455/414.2 |
| 2005/0075097 A1 | * | 4/2005 | Lehikoinen et al. | 455/414.1 |
| 2005/0273489 A1 | | 12/2005 | Pecht et al. | |
| 2005/0273503 A1 | * | 12/2005 | Carr et al. | 709/219 |
| 2007/0043504 A1 | * | 2/2007 | Dorfman et al. | 701/213 |
| 2007/0060099 A1 | * | 3/2007 | Ramer et al. | 455/405 |
| 2007/0127555 A1 | * | 6/2007 | Lynch | 375/142 |
| 2007/0136302 A1 | * | 6/2007 | Zuber | 707/10 |
| 2007/0136597 A1 | * | 6/2007 | Levy | 713/176 |
| 2007/0206101 A1 | * | 9/2007 | Ueno et al. | 348/211.99 |
| 2007/0294177 A1 | * | 12/2007 | Volk et al. | 705/52 |
| 2008/0021976 A1 | | 1/2008 | Chen et al. | |
| 2008/0104128 A1 | * | 5/2008 | Drayer et al. | 707/200 |
| 2008/0133641 A1 | * | 6/2008 | Gent et al. | 709/201 |
| 2008/0133697 A1 | * | 6/2008 | Stewart et al. | 709/217 |
| 2008/0205774 A1 | * | 8/2008 | Brinker et al. | 382/225 |
| 2008/0207232 A1 | * | 8/2008 | Rice et al. | 455/466 |

(Continued)

FOREIGN PATENT DOCUMENTS

| | | | |
|---|---|---|---|
| EP | 2120167 A1 | * | 11/2009 |
| WO | WO 2008094946 A2 | * | 8/2008 |
| WO | WO 2009085142 A2 | * | 7/2009 |

OTHER PUBLICATIONS

Automatic Weblog generation using mobile context, proceedings of MoMM2009, pp. 622-626, HC14UCE 2009.*

(Continued)

*Primary Examiner* — Augustine K Obisesan
(74) *Attorney, Agent, or Firm* — Carole Boelitz; Peter L. Taylor; Micky Minhas

(57) ABSTRACT

An autonomous blog engine is implemented to enable the autonomous generation of a blog. The autonomous blog engine receives media objects that are captured by an electronic device during a trip session. The autonomous blog engine determines a place of interest based on photographs selected from the media objects. The autonomous blog engine then generates textual content using one or more pre-stored knowledge items that include information on the place of interest. The autonomous blog engine further autonomously publishes a blog entry on the place of interest that includes one or more photographs from the photograph cluster and the textual content.

19 Claims, 10 Drawing Sheets

(56) References Cited

U.S. PATENT DOCUMENTS

| | | | |
|---|---|---|---|
| 2008/0270220 | A1 | 10/2008 | Ramer et al. |
| 2009/0119275 | A1* | 5/2009 | Chen et al. ............... 707/5 |
| 2009/0209335 | A1* | 8/2009 | Pearce .................. 463/30 |
| 2009/0259686 | A1* | 10/2009 | Figueroa et al. ........... 707/104.1 |
| 2009/0279794 | A1* | 11/2009 | Brucher et al. ............ 382/225 |
| 2009/0280783 | A1* | 11/2009 | Klassen et al. ............ 455/414.1 |
| 2010/0041378 | A1* | 2/2010 | Aceves et al. ............. 455/414.1 |
| 2010/0080551 | A1* | 4/2010 | Chen et al. ................ 396/310 |
| 2010/0106801 | A1* | 4/2010 | Bliss et al. ................ 709/219 |
| 2010/0161635 | A1 | 6/2010 | Dey |
| 2010/0179857 | A1* | 7/2010 | Kalaboukis et al. .......... 705/10 |
| 2011/0047182 | A1* | 2/2011 | Shepherd et al. ............ 707/780 |

OTHER PUBLICATIONS

Automatic Collection and Monitoring of Japanese Weblogs, Nanno et al., WWW 2004.*

Travel Blog Assistant System (TBAS)—An Example Scenario of How to Enrich Text with Images and Images with Text using Online Multimedia Repositories, Bressan et al., VISAPP Workshop on Metadata Mining for Image Understanding, Workshop, 2008.*

Automatic Tag Recommendation for Web 2.0 Blogosphere by Extracting Keywords from Similar Blogs, Lee et al., 7th International Conference on Applied Computer and Applied Computational Science (ACACOS'08), pp. 312-317, Apr. 6-8, 2008.*

Detecting innovative topics based on user-interest ontology, Nakatsuji et al., Web Semantics: Science, Services and Agents on the World Wide Web, 7(2), pp. 107-120, Apr. 2009.*

U.S. Appl. No. 12/939,132, filed Nov. 3, 2010, Mei, "Sponsored Multi-Media Blogging".

Bamford et al., "Space-time travel blogging using a mobile phone," ACM International Conference Proceeding Series, vol. 203, Jun. 2007, pp. 1-8.

Bezdek et al., "FCM: The fuzzy c-means clustering algorithm," Comp. Geosci. vol. 10, No. 2-3, May 1983, pp. 191-203.

"BingMap", retrieved on Sep. 10, 2010 at <<http://www.bing.com/mapindia/print.aspx?mkt=en-in&z=4&s=r&cp=n0n04rqn8rss&pt=pb>>, Navteq, 2009, pp. 1-2.

Bressan, et al., "Travel Blog Assistant System (TBAS)—An Example Scenario of How to Enrich Text with Images and Images with Text using Online Multimedia Repositories", Metadata Mining for Image Understanding Workshop, Jan. 2008, pp. 90-104.

Cemerlang, et al., "Towards Automatic Mobile Blogging", IEEE International Conference on Multimedia and Expo (ICME), Jul. 2006, pp. 2033-2036.

Costabello, et al., "Time Based Context Cluster Analysis for Automatic Blog Generation", retrieved on Sep. 10, 2010 at <<http://citeseerx.ist.psu.edu/viewdoc/download?doi=10.1.1.155.860&rep=rep1&type=pdf>>, Workshop on Social Web Search and Mining—WWW 2006, Beijing, China, Apr. 2008, 8 pages.

Lim, et al., "SnapToTell: Ubiquitous Information Access from Camera, A Picture-Driven Tourist Information Directory Service", Proceeding of Mobile HCI 2004, Glasgow, Scotland, Sep. 2004, pp. 21-27.

Nokia, "Nokia Lifeblog", retrieved on Jun. 26, 2007 at <<http://www.nokia.com/nokia/0,,55360,00.htms>>, Nokia, 2004, 1 page.

Microsoft, "Photosynth—Use your camera to stitch the world", retrieved on Sep. 10, 2010 at <<http://photosynth.net>>, Microsoft Corporation, 2010, 1 page.

Reiter, et al., "Building Applied Natural Language Generation Systems", Cambridge University Press, Natural Language Engineering, vol. 3, No. 1, Mar. 1997, pp. 57-87.

Rother, et al., "AutoCollage", ACM Transactions on Graphics (TOG), vol. 25, No. 3, Jul. 2006, pp. 847-852.

Smeulders, et al., "Content-Based Image Retrieval at the End of the Early Years", IEEE Transactions on Pattern Analysis and Machine Intelligence, vol. 22, No. 12, Dec. 2000, pp. 1349-1380.

Tong, et al., "Blur Detection for Digital Images Using Wavelet Transform", In Proceedings of IEEE International Conference on Multimedia & Expo 2004, Jun. 2004, pp. 17-20.

Wang, et al., "Picture Collage", Proceedings of Conference on Computer Vision and Pattern Recognition (CVPR), vol. 1, Jun. 2006 pp. 347-354.

Zheng, et al., "GeoLife2.0: A Location-Based Social Networking Service", IEEE Computer Society, Tenth International Conference on Mobile Data Management (MDM 2009), May 2009, pp. 357-358.

Li, et al., "Melog—Mobile Experience Sharing Through Automatic Multimedia Blogging", ACM Multimedia International Conference 2010, WSIS ACM Workshop on Mobile Cloud Media Computing, Oct. 2010, 10 pages.

* cited by examiner

AUTONOMOUS MOBILE BLOGGING

BACKGROUND

Mobile devices such as camera phones are increasingly common. These mobile devices may be capable of acquiring, storing, transmitting, and presenting text, images, video and audio data. Thus, more and more people are using their mobile devices to record daily experiences. For example, camera phones are often used by users to record images of various locations visited during a travel excursion. However, while users frequently desire to share text, images, and other data related to their daily experiences with their friends using their mobile devices, such tasks may prove to be complex and cumbersome. For example, in order for a user to share photographs taken with a camera phone, the user may spend a considerable amount of time selecting, transferring, arranging, editing and/or tagging the photographs for presentation on a blogging website. Such inconvenience may reduce a user's desire to share daily experiences as captured by a mobile device, or may result in a user sharing image, video, or audio data of his or her experiences in a haphazard and incoherent manner. Moreover, due to the fact that mobile devices generally have small displays and user interfaces, the tasks associated with composing and arranging media content for display on blogging website in real-time or near real-time may be especially difficult.

SUMMARY

Described herein are techniques that enable a mobile device to leverage the power of cloud computing and network connectivity to become an effective tool for the automatic creation of blogs. In various embodiments, the compilation and annotation of media objects (e.g., images, video objects, audio objects, and/or multimedia objects) captured by the mobile device, as well as the arrangement of the media objects with textual information into a blog, may be performed automatically by an autonomous blog engine. The autonomous blog engine may be implemented on one or more servers of a computing cloud. Accordingly, a user may simply use the mobile device to capture photographs, video, and audio of various places as desired, and the autonomous blog engine may automatically generate a blog based on the captured data and further post the blog on a blog website.

In at least one embodiment, an autonomous blog engine is implemented to enable the autonomous generation of a blog. The autonomous blog engine receives media objects that are captured by an electronic device during a trip session. The autonomous blog engine initially clusters media objects that are photographs into a photograph cluster. Subsequently, the autonomous blog engine determines a place of interest that corresponds to the photograph cluster. The autonomous blog engine then autonomously publishes a blog entry on the place of interest that includes one or more photographs from the photograph cluster and textual content that is generated using one or more pre-stored knowledge items that include information about the place of interest.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

A mobile device may be implemented to leverage the power of cloud computing and network connectivity to become an effective tool for the automatic creation of blogs. The compilation and annotation of media objects (e.g., photographs, video clips, audio clips, and/or multimedia clips) captured by the mobile device, as well as the arrangement of the media objects with textual information into a blog, may be performed automatically by an autonomous blog engine. The autonomous blog engine may be implemented on one or more servers of a computing cloud. Accordingly, a user may use the mobile device to capture photographs, video, and audio of various locations as desired, and the autonomous blog engine may automatically generate a blog based on the captured data and further post the blog on a blog website.

The mobile device and the autonomous blog engine described herein enable a user to create a blog regarding events and experiences of the user with minimal manual input. In one example, as the user travels around different locations acquiring media objects at different places of interest using the mobile device, the autonomous blog engine may automatically create blog entries for at least some of the places of interest, and upload the blog entries to a blogging site in real time or near real-time. In another example, the autonomous blog engine may automatically create the blog entries for at least some of the places of interest at a later time.

Thus, users who are equipped with mobile devices that communicate with the autonomous blog engine are able to share events and experiences with other users with minimal interruption to their normal routine, and without spending considerable time and effort planning and creating a blog.

Various example implementations of the autonomous mobile blogging techniques are described below with reference to FIGS. 1-10.

Illustrative Environment

Figure 1:
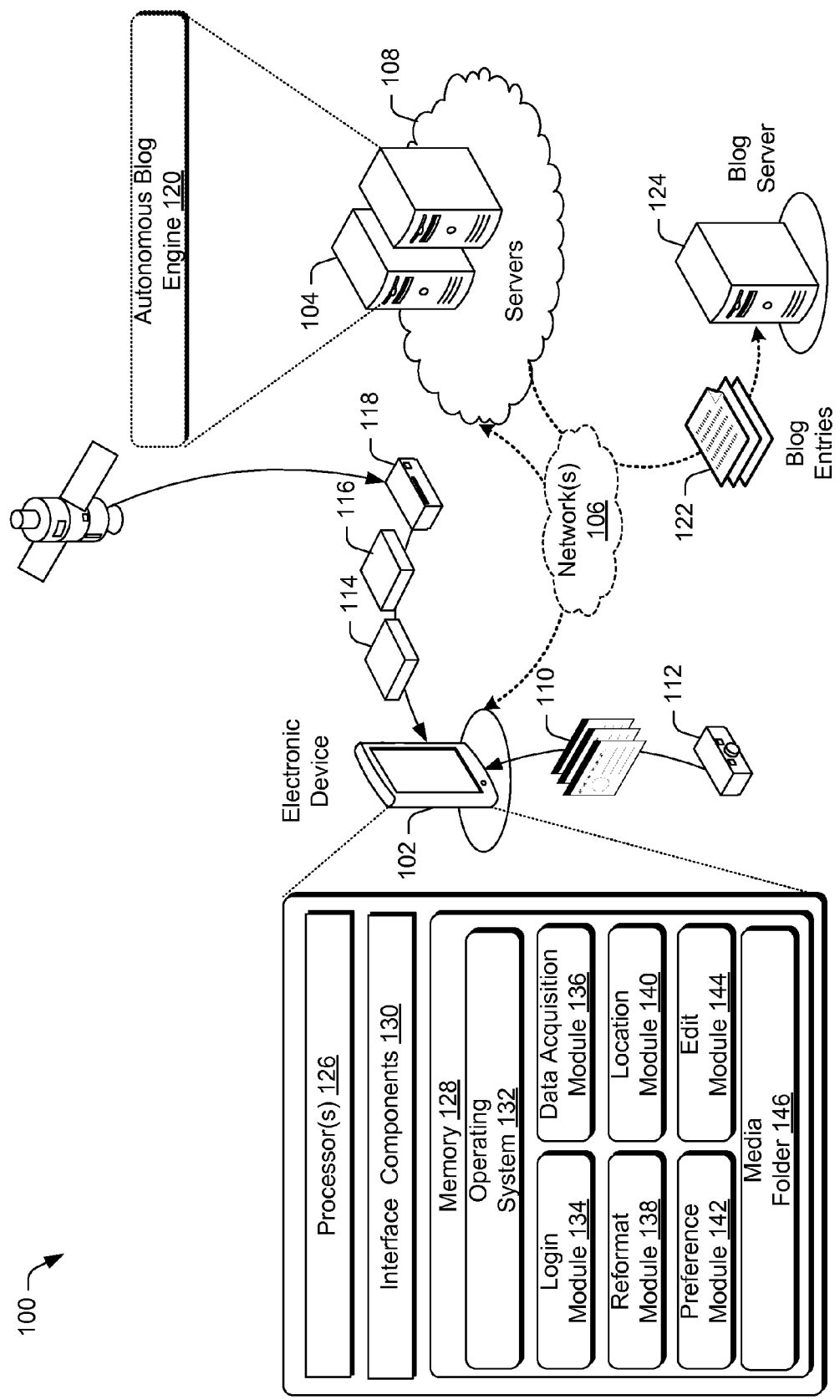
FIG. 1 is a block diagram of an illustrative environment that implements autonomous mobile blogging.

FIG. 1 is a block diagram of an illustrative environment 100 that implements autonomous mobile blogging. The illustrative environment 100 may include an electronic device 102 that is connected to one or more servers 104 by a network 106. The one or more servers 104 may be part of a computing cloud 108. In some embodiments, the one or more servers 104 may reside in different data centers of the computing cloud 108. The network 106 may be a local area network ("LAN"), a larger network such as a wide area network ("WAN"), and/or a collection of networks, such as the Internet. Protocols for network communication, such as TCP/IP, may be used to implement the network 106. The network 106 may be implemented using various wireless communication interface technology (e.g., cellular, PCS, WiFi, Ultrawideband, Bluetooth, satellite transmissions), and/or the like. Alternatively or concurrently, the network 106 may also be implemented using various wired communication technology, such as LAN Ethernet, WAN Ethernet, a universal serial bus (USB), a high speed serial bus, and/or the like.

The electronic device 102 may capture media objects 110 (e.g., photographs, video clips, audio clips, and/or multimedia clips) using on-board and/or attached input interfaces 112. The input interfaces 112 may include a still image camera, a video camera, a microphone, and/or the like. The electronic device 102 may also capture contextual information, such geolocation data 114 and sensor data 116. The geolocation data 114 indicates the position of the electronic device 102 with respect to the globe. The sensor data 116 may include motion data, compass heading data, speed, velocity, and/or the like, and may be gathered using on-board and/or attached sensors 118. Subsequently, the electronic device 102 may upload the media objects 110 and the contextual information to the one or more servers 104.

The one or more servers 104 support an autonomous blog engine 120 that analyzes the contextual information and/or the media objects 110 to determine the various physical or geographical locations associated with the media objects 110, as well as the movement of the electronic device 102 around the various locations. Thus, as the user who is carrying the electronic device 102 visits different locations and captures media objects 110 at different places of interest (POIs) that are within the different locations, the autonomous blog engine 120 may automatically create blog entries 122 for at least some of the sites of the interest. Each of the blog entries 122 may include photographs, audio, and/or video data acquired at the location, as well as textual descriptions related to the location. As further described below, depending on a user affection rating (e.g., positive, neutral, or negative) assigned by the user to each POI, the textual description for a POI may be a positive description, a neutral description, or a negative description. The autonomous blog engine 120 may further automatically upload each blog entry to a blog website on a blog server 124 that is pre-designated by the user. In some embodiments, if the user desires, the user may exert some control over the blog generation process. For example, the autonomous blog engine 120 may be configured to prompt the user to review, edit, and/or approve the content of a blog entry 122 prior to the blog entry 122 being uploaded to the blog web site.

The electronic device 102 may be any mobile electronic device that is capable of acquiring text, image, video and audio data using input interfaces (e.g., camera, keyboard, touch display, microphone, and/or the like), process such data, and output the processed data via output interfaces (e.g., displays, screens, speakers, and/or the like). The electronic device 102 may include various sensors 118 that acquire other information. The sensors 118 may include a geolocation sensor, such as a global position system (GPS) sensor and/or a network-assisted GPS sensor. The sensors 118 may also include a compass direction sensor, a motion sensor, an inertia sensor, and/or the like. In various embodiments, the electronic device 102 may be a smart phone, a personal digital assistant (PDA), a digital camera, a portable media player, a laptop computer, a handheld computer, and/or the like.

The electronic device 102 may further include one or more processors 126, memory 128, as well as wireless and/or wired communication interface components 130 that enable the electronic device 102 to transmit and receive data via the network 106. The memory 128 may store an operating system 132.

The operating system 132 may include components that enable the electronic device 102 to receive data via various inputs (e.g., user controls, network interfaces, and/or memory devices), and process the data using the one or more processors 126 to generate output. The operating system 132 may include one or more components that present the output (e.g., display an image on an electronic display, store data in memory, transmit data to another electronic device, etc.). Additionally, the operating system 132 may include other components that perform other functions generally associated with an operating system.

The memory 128 may further store components that support the collection of media objects 110, associated contextual information, as well as the configuration of settings related to blog publishing. The components, or modules, may include routines, programs instructions, objects, scripts, and/or data structures that perform particular tasks or implement particular abstract data types. The components may include, but are not limited to, a login module 134, a data acquisition module 136, a reformat module 138, a location module 140, a preference module 142, and an edit module 144.

The login module 134 may authenticate the electronic device 102 with the autonomous blog engine 120 that is implemented on the one or more servers 104. In some embodiments, the login module 134 may, when the device is powered on, automatically authenticate the electronic device 102 using authentication credentials that are pre-stored on the electronic device 102. In other embodiments, the login module 134 may be configured to prompt the user of the electronic device 102 to supply the appropriate authentication credentials. The authentication credentials may include, but are not limited to, a user name, a password, an electronic certificate, a biometric characteristic, and/or the like.

The data acquisition module 136 may monitor a media folder 146 that is on the electronic device 102. The data acquisition module 136 may perform the monitoring following the authentication of the electronic 102 to the autonomous blog engine 120. The media folder 146 may be a file directory location in the memory 128 where media objects 110 (e.g., photographs, video clips, audio clips, and/or multimedia clips) acquired by the input interfaces 112 of the electronic device 102 are stored. However, in some embodiments, rather than a single media folder 146, the electronic device 102 may have multiple media folders. For example, the mobile device 102 may store acquired photographs in a first media folder, audio data in a second folder, video data in a third folder, and/or the like. In such embodiments, the data acquisition module 136 may perform its functions on the plurality of media folders in the same manner.

Thus, when the data acquisition module 136 determines that a media object 110 has been acquired by the electronic device 102, the data acquisition module 136 may obtain the geolocation information that is associated with the media object 110. In various embodiments, the data acquisition module 136 may interface with the geolocation sensor on the electronic device 102 to acquire the geolocation information. In other embodiments in which the electronic device 102 automatically embeds the geolocation information as metadata within the newly acquired media object 110, the data acquisition module 136 may read the media object 110 and extract the geolocation information. The data acquisition module 136 may also extract time and date information associated with the capture of media object 110. Subsequently, the data acquisition module 136 may upload the newly acquired media object 110 and associated information to the one or more servers 104. The associated information may include the geolocation information, a user identifier, the time and date the media object 110 was acquired, and/or the like.

In some embodiments, the data acquisition module 136 may use the reformat module 138 to reformat each media object 110 prior to uploading the media object 110 to the autonomous blog engine 120. In various embodiments, the reformat module 138 may reduce the file size of a media object 110 to conform to a predetermined data size limit when the file size of the media object exceeds the limit. For example, when the media object 110 is a photograph i.e., still image, the reformat module 138 may reduce the aspect ratios of the still image so that the size of the resultant image is equal to or less than the predetermined file size limit. In another example, the reformat module 138 may also cut a portion of a media object 110 in the form of an audio clip, a video data clip, or a multimedia clip that includes both audio and video, if such a media object 110 exceeds a corresponding file size limit. In various embodiments, the reformat module 138 may use different size limits for different types of media objects. For instance, a 100 kilobyte (KB) limit may be used for photographs, while a one megabyte (MB) limit may be used for multimedia objects. In other embodiments, the reformat module 138 may reduce the resolution of a media object 110 in the form of a still image, a video data clip, or a multimedia clip if such a media object 110 exceeds a corresponding resolution limit. For example, a 600 pixels by 800 pixels resolution limit may be used for photographs, while a resolution limit of 240 pixels by 320 pixels may be used for video data clips or multimedia clips.

The location module 140 may periodically query the geolocation sensor to determine a current geolocation of the electronic device 102. The location module 140 may further upload the determined geolocation to the autonomous blog engine 120. As further described below, the geolocations obtained by the location module 140 may be useful in generating a blog in real-time or near real-time.

The preference module 142 may enable the user of the electronic device 102 to interact with the autonomous blog engine 120 on the one or more servers 104. Through the preference module 142, the user may configure various autonomous blog generation options. Example autonomous blog generation options provided by the preference module 142 are depicted in FIG. 2.

Figure 2:
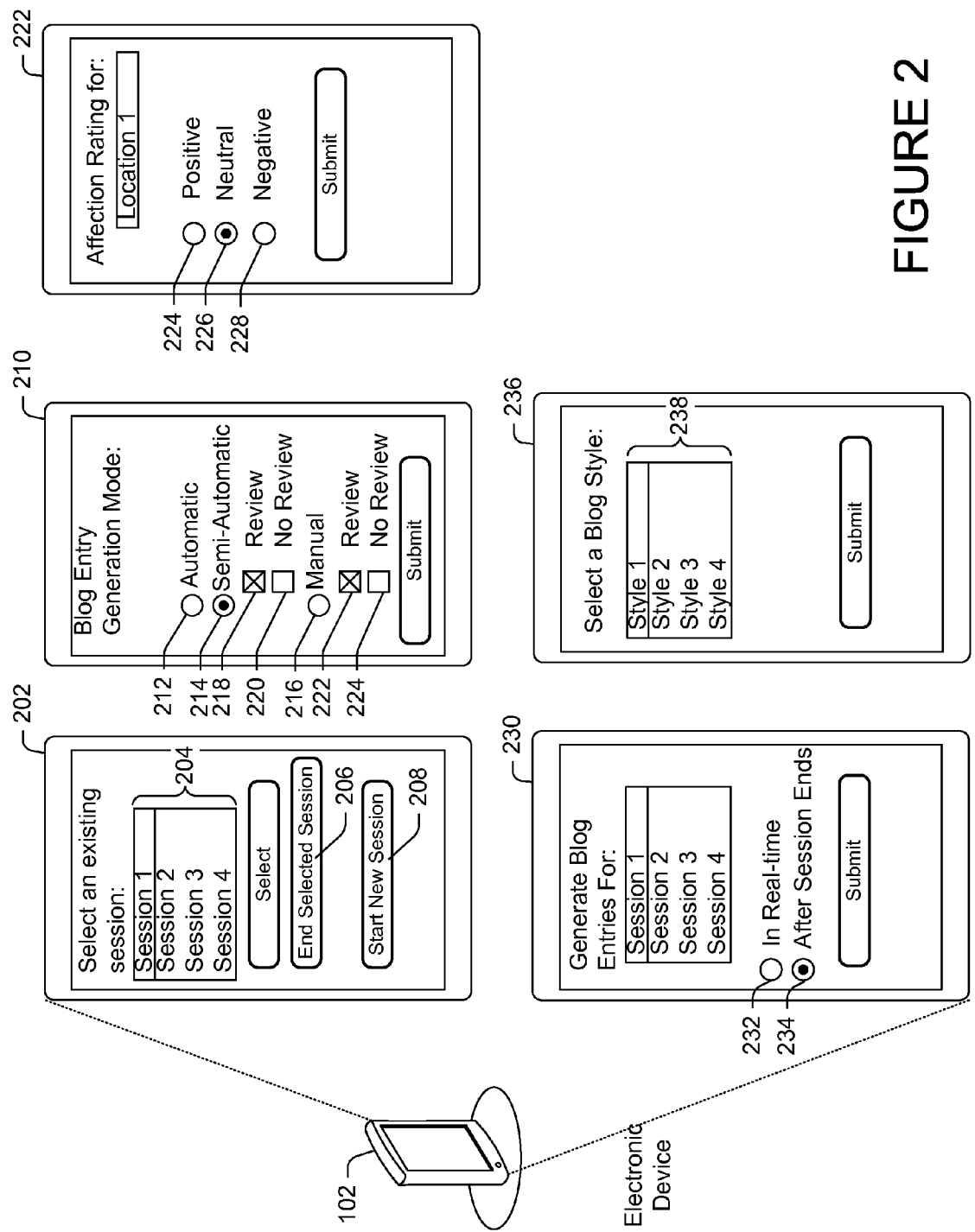
FIG. 2 is a block diagram that depicts various example blog generation options that are presented on a display of an electronic device.

FIG. 2 is a block diagram that depicts various example blog generation options that may be presented on a display of the electronic device 102. As shown in example display 202, following a successful authentication via the login module 134, the autonomous blog engine 120 may return representations of one or more previous trip sessions undertaken by the user to the electronic device 102. A trip session may include one or more locations visited by the user, and is associated with a collection of media objects 110 that were captured at the locations. The representations of the previous trip sessions may be rendered by the preference module 142 for display on the electronic device 102 as selectable options 204. Thus, the user may choose to continue a previous trip session, that is, acquire additional media objects 110 at other locations for the trip session. Further, the preference module 142 may also display an option 206 that enables a user to end a previous trip session, as well as an option 208 for the user to create a new trip session, that is, start a new collection of media objects 110 that will be acquired at different locations.

Additionally, the preference module 142 may also enable the user of the electronic device 102 to configure a desired blog generation mode for the autonomous blog engine 120. As shown in example display 210, a user may command the autonomous blog engine 120 to generate blogs using one of three different modes: (1) fully automatic mode 212; (2) semi-automatic mode 214; and (3) manual mode 216. During the fully automatic mode, the autonomous blog engine 120 analyzes the acquired media objects 110 and contextual information received from the electronic device 102 as the user moves from location to location, and automatically generates and publishes blog entries about at least some of the locations to a blogging website without any user intervention. In the semi-automatic mode, the autonomous blog engine 120 generates blog entries in the same manner, but the user may be prompted to initiate the generation of each blog entry. For example, after the autonomous blog engine 120 determines that the user has finished visiting a location, the autonomous blog engine 120 may display a selection menu on the display of the electronic device 102, so that the user may activate an option on the selection menu to initiate the generation of the blog entry or cancel the generation of the blog entry. Further while selecting the semi-automatic mode, the user may further select between an option 218 of reviewing and/or editing the blog entry prior to publication, or an option 220 of blog generation and publication without further user intervention.

In such instances, following the blog entry generation, the preference module 142 may use the edit module 144 to display one or more generated blog entries from the autonomous blog engine 120 on the electronic device 102, receive edits from the user, and send the one or more edited blog entries to the autonomous blog engine 120 for eventual publishing. In various embodiments, the edit module 144 may enable the user to edit the textual content and the arrangement of the media objects 110 (e.g., photographs, audio clips, video clips, and/or multimedia clips) in the blog entries generated by the autonomous blog engine 120. In some embodiments, the edit module 144 may also provide the user with an option to cancel the publication of individual blog entries.

In the manual mode, the user may manually trigger analysis and generation of a blog entry for publication after visiting a location and acquiring media objects 110 at the location. In some embodiments, while selecting the manual mode, the user may further select between an option 222 of reviewing and/or editing the blog entry prior to publication, or an option 224 of blog generation and publication without further user intervention.

The preference module 142 may further enable the user of the electronic device 102 to assign affection ratings to different locations. Thus, as the user captures media objects 110 at various locations, the user may also input a corresponding affection rating for each location. As shown in example display 222, the preference module 142 may provide a set of radio buttons 224-228 for the input of affection ratings. Accordingly, as the user is capturing media objects 110 at a location, the user may select the "positive" radio button 224 if the user has a favorable impression of the location. Alternatively, if the user has a no particular feelings regarding a location as the user is capturing media objects 110 at the location, the user may select the "neutral" radio button 226. In contrast, if the user has a negative impression of a location, the user may select the "negative" radio button 228 as the user is capturing media objects 110 at the location.

As further described below, the affection rating of a location may eventually be used to develop textual descriptions of the location. For example, a negative affection rating for a location with a quiet environment may result in a textual description that describes the location as "boring," while a positive affection rating for the same location may result in a textual description of "tranquil." In another example, a location may be described as "noisy and chaotic" due to a negative affection rating, and "energetic and colorful" due to a positive affection rating.

In other embodiments, the preference module 142 may enable the user to assign an overall affection rating to a trip session that encompasses a plurality of locations, rather than assign an individual affection rating to each location. Further, the preference module 142 may also enable a user to re-rate a location, which may cause the autonomous blog engine 120 to automatically update a previously generated blog entry with new textual descriptions that conform to the adjusted affection rating.

While the affection rating interface shown in the example display 222 is implemented using radio buttons, the affection rating interface may also be implemented in other ways in additional embodiments. For example, a slider bar based on a graduated numerical scale may be implemented (e.g., a value of "10" indicates a completely positive impression, while a value of "1" indicates a completely negative impression). Other implementations may include a star rating scale, in which the more stars assigned, the more positive the impression, as well as other rating scales.

As further shown in example display 230, the preference module 142 may provide a configuration menu that enables the user to select between an option 232 to publish blog entries for locations in a trip session in real-time or near real-time, or an option 234 to publish blog entries for locations in a trip session following the conclusion of the session. Thus, as further described below, if the user selects the "in real-time" option, a blog entry for a location may be published as soon as the user has finished a visit to a location.

As shown in the exemplary display 236, the preference module 142 may additionally enable the user of the electronic device 102 to select a blog style from a plurality of blog styles for the construction of the blog entries into a blog by the autonomous blog engine 120. For example, the exemplary display 236 may include style options 238, in which each of the style options corresponds to a particular format for presenting one or more blog entries.

Returning to FIG. 1, the modules 134-144 may be part of an application that is installed on the electronic device 102. The application may execute in an operating environment provided by the operating system 132. As such, the application may leverage the functions of the operating system 132 to display data on the electronic device 102 and to receive inputs from the user. However, in alternative embodiments, the application may be a stand-alone application that operates outside of the operating system 132. In such embodiments, the application may include further components that provide the application with the ability to independently present data to the user, and receive inputs from the user via the input and output interfaces of the electronic device 102.

Figure 3:
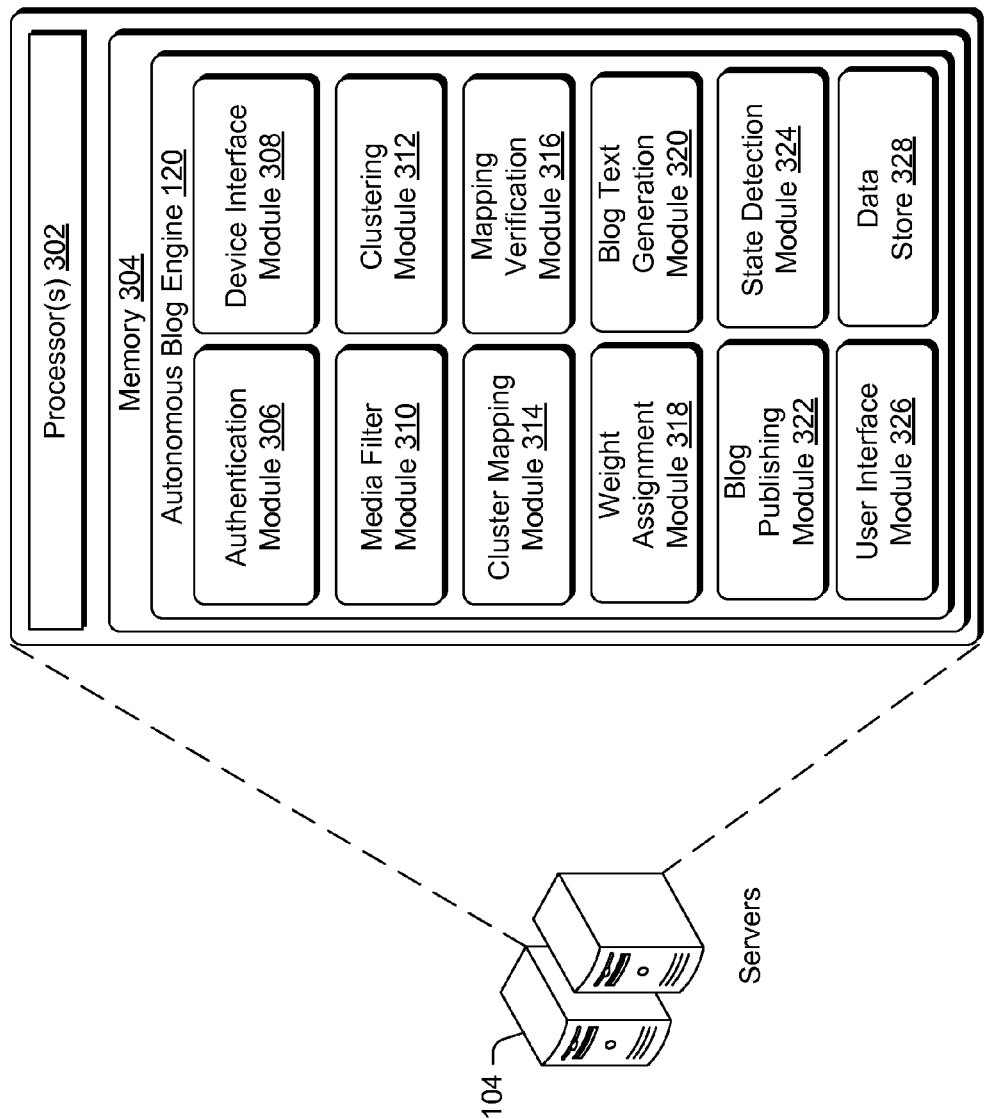
FIG. 3 is a block diagram of an example autonomous blog engine that automatically generates blog entries.

FIG. 3 is a block diagram of an autonomous blog engine, such as the autonomous blog engine 120, which automatically generates blog entries for publication on a blog web site. As described above, the autonomous blog engine 120 may be implemented on the one or more servers 104. In some embodiments, the one or more servers 104 may be part of a computing cloud 108.

The one or more servers 104 may include one or more processors 302, memory 304, and/or user interfaces that enable a user to interact with the autonomous blog engine. The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 304 may store components of the autonomous blog engine 120 that generate blog entries from media objects 110 and the geolocation data 114 and the sensor data 116 that are received from an electronic device, such as the electronic device 102. The components, or modules, may include routines, programs instructions, objects, scripts, and/or data structures that perform particular tasks or implement particular abstract data types. The components may include, but are not limited to, an authentication module 306, a device interface module 308, a media filter module 310, a clustering module 312, a cluster mapping module 314, a mapping verification module 316, a weight assignment module 318, a blog text generation module 320, a blog publishing module 322, a state detection module 324, a user interface module 326, and a data store 328.

The authentication module 306 receives and validates authentication credentials from the login module 134 of the electronic device 102. For example, the authentication module 306 may validate the received authentication credentials against known credentials that are stored in the data store 328. Accordingly, the authentication module 306 grants the electronic device 102 access to the autonomous blog engine 120 when authentication is successful.

The device interface module 308 interfaces with the data acquisition module 136, the location module 140, and the preference module 142 of the electronic device 102. As such, the device interface module 308 acquires media objects 110 captured by the electronic device 102, as well as contextual information associated with the captured media objects 110. The contextual information may include geolocation data 114, sensor data 116, the time and date each media object 110 is captured, and/or the like. The device interface module 308 may sort the media objects 110 and the corresponding geolocation data 114 for storage in the data store 328. In various embodiments, the media objects 110 and the corresponding geolocation data 114 may be sorted and stored in the data store 328 according to trip session by the device interface module 308. The device interface module 308 may also receive various settings selected by the user via the preference module 142. The device interface module 308 may also send data to the various modules of the electronic device 102.

The media filter module 310 filters the media objects 110 stored in the data store 328 to find media objects 110 that do not meet one or more quality thresholds. In various embodiments, the media filter module 310 may filter out low quality photographs, such as blurred, out-of-focus, and/or incorrectly exposed photographs. Likewise, the media filter module 310 may also filter video objects based on similar criteria. In such embodiments, the media filter module 310 may use a predetermined threshold value to detect overexposure of images.

Further, the media filter module 310 may implement an algorithm that performs edge type and sharpness analysis using a Harr wavelet transform or equivalent techniques to detect blurred and out-of-focus images. The media filter module 310 may also filter out audio records that fail to meet one or more predetermined clarity thresholds (e.g., excessive static, excessive background noise, distortions, and/or the like).

The media filter module 310 may remove the filtered out media objects in the form of audio clips, video clips, and/or multimedia clips. However, the media filter module 310 may mark photographs that have been filter out, but such photographs are not removed right away. Instead, the geolocation information associated with such photographs may be further processed by the clustering module 312 prior to their eventual removal by the media filter module 310.

The clustering module 312 clusters the photographs captured by the electronic device 102 according to the associated geolocation information. The cluster module 312 operates on the assumption that the user may take more photographs at a location that the user is more interested in and fewer photographs at a location that draws less user interest. Accordingly, the cluster module 312 may provide an approximation of locations of interest by clustering the photographs. In many instances, the locations of interest may correspond to known man-made or natural landmarks (e.g., monuments, buildings, lakes, mountains, and/or the like), which are referred to herein as POIs. Thus, a center of a photograph cluster may correspond to one POI. However, in some instances, the user may photograph a spot near a POI, or take photographs between two POIs. As such, the clustering module 312 may use a fuzzy logic clustering algorithm, such as the fuzzy c-means clustering algorithm, to obtain a group of coefficients, in which each coefficient represent the possibility of a corresponding photograph belonging to each cluster.

The cluster mapping module 314 may work in conjunction with the mapping verification module 316 to match a single POI to each photograph cluster. As further explained below, the cluster mapping module 314 may preliminarily match a photograph cluster to a plurality of candidate POIs based on physical distances between a cluster center associated with the photograph cluster and the geolocations of the candidate POIs. Subsequently, the mapping verification module 316 may select a particular candidate POI of the candidate POIs as a match to the photograph cluster when a photograph from the photograph cluster depicts one or more features that match corresponding features depicted in one or more known sample photographs of the particular candidate POI.

Initially, the cluster mapping module 314 may map each photograph cluster to a POI. In various embodiments, the cluster mapping module 314 may find each candidate visited POI based on a physical distance between a POI and each photograph cluster, as computed based on the associated geolocation of a center of each photograph cluster and the known geolocation of each POI. In this way, the cluster mapping module 314 may choose the one or more nearest POIs as candidate POIs for each photograph cluster based on such distances.

In various embodiments, the cluster mapping module 314 may first set an interval $[\alpha, \beta]$ and a predetermined number of POIs $\gamma$ for each cluster. Thus, each POI with a distance from the cluster center that is less than $\alpha$ may be selected as a candidate POI. The cluster center is a mean of the geolocations at which the photographs were captured, in which each location is weighted by a degree that the geolocation belongs in the cluster. However, if the number of selected POIs n is less than $\gamma$, the cluster mapping module 314 may further select at most $(\gamma-n)$ the nearest POIs from the predetermined number of POIs as candidate POIs, in which the distance of each nearest POI from the cluster center is less than $\beta$. In other words, the cluster module 314 may initially attempt to select a predetermined number of POIs that are less than a first physical distance threshold from the cluster center as candidate POIs. However, if such selection results in an insufficient number of candidate POIs, then the cluster module 314 may attempt to select additional POIs as candidate POIs that are farther away from the cluster center but still within a second physical distance threshold of the cluster center. In this way, the cluster mapping module 314 may select the predetermined number of POIs in different circumstances.

The mapping verification module 316 selects a matching POI from the one or more candidate POIs for each photograph cluster. The plurality of candidate POIs for each photograph cluster may be generated by the cluster mapping module 314. The mapping verification module 316 may select a matching POI by comparing photographs from each cluster to one or more known sample photographs of each candidate POI. Thus, if there is at least one match between a photograph from a particular photograph cluster and a known sample photograph of a candidate POI, the mapping verification module 316 may determine that the particular photograph cluster corresponds to the candidate POI. In this way, the mapping verification module 316 may match each photograph cluster to a corresponding candidate POI. In some embodiments, if a candidate POI did not match any of the photograph clusters, but geolocation data indicates the electronic device 102 was in the vicinity of one or more candidate POIs, the mapping verification module 316 may determine that the user traveled through the candidate POIs without taking any photographs. On the other hand, if mapping verification module 316 is unable to match a particular photograph cluster to a candidate POI based on photographic comparison, the particular photograph cluster may be discarded.

In some embodiments, the mapping verification module 316 may compare a pair of photographs by extracting and comparing scale-invariant feature transform (SIFT) features from each photograph. However, in other embodiments, the mapping verification module 316 may compare a pair of photographs using other image comparison techniques.

In further embodiments, the weight assignment module 318 assigns a significance weight to a POI that matches a location of interest to the user. The significance weight may represent the use's level of interest in the POI. The weight assignment module 318 may assign the significance weight for the POI based on media objects that are associated with the POI. In some embodiments, the weight assignment module 318 may assign the significance weight to the POI based on the number of photographs in a photograph cluster of the POI as compared to the photographs in the photograph clusters of other POIs. For example, the greater the comparative number of photographs in the cluster of the POI, the higher the significance weight that is assigned to the POI by the weight assignment module 318.

In other embodiments, the weight assignment module 318 may further modify the significance weight assigned to the POI based the number of audio objects and/or vide objects that are within a predetermined distance from the POI. For example, the presence of each of such audio objects and/or video objects may result in a corresponding increase in the assigned significance weight of the POI.

Figure 4:
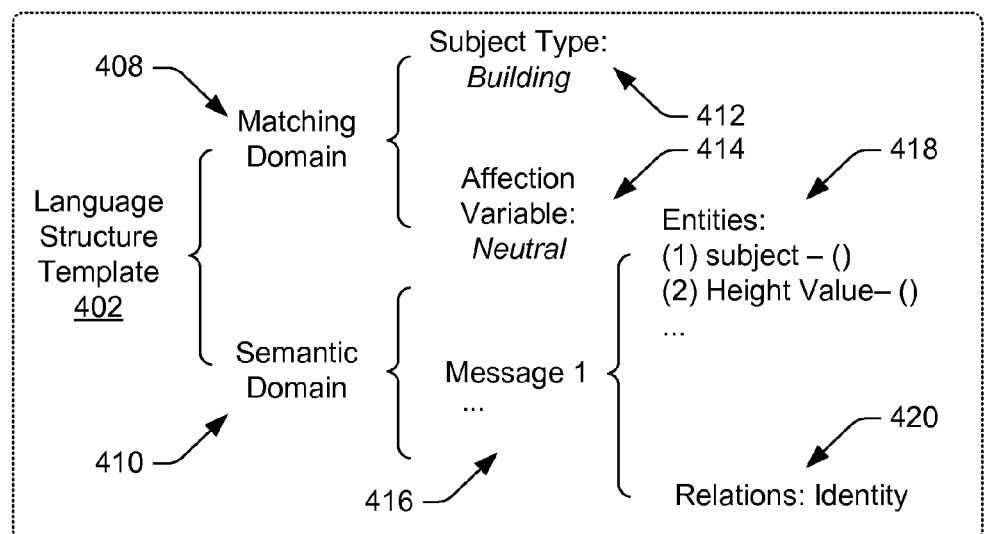
FIG. 4 is a schematic diagram that illustrates example language components used by a natural language generation (NLG) algorithm of an autonomous blog engine to generate a blog entry.
Figure 4:
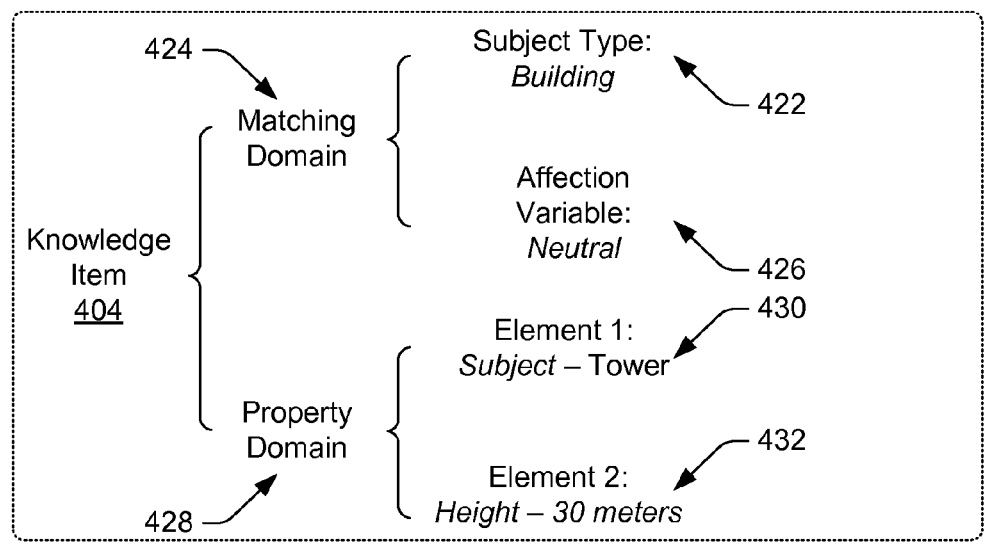
Figure 4:
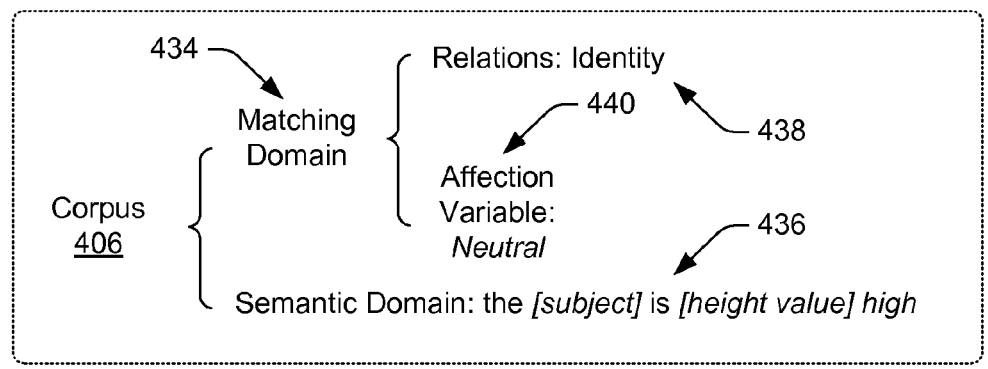

The blog text generation module 320 may generate text for blog entries for the visited POIs. In various embodiments, the blog text generation module 320 may use a natural language generation (NLG) algorithm to accomplish the text generation. As shown in FIG. 4, the NLG algorithm may construct each blog based on pre-stored knowledge regarding each visited POI, as well as the user supplied affection rating associated with each POI.

FIG. 4 is a schematic diagram that illustrates various example language components used by a blog generation module to generate a blog entry using a NLG algorithm. The blog text generation module 320 may use a language structure template (e.g., language structure template 402), knowledge items (e.g., knowledge item 404), and a corpus (e.g., corpus 406) that are stored for a particular POI, to generate a corresponding blog entry for the particular POI.

For example, as further described below, in order to generate a blog entry for a particular POI, such as a man-made structure in the form of a tower that is visited by the user, the blog text generation module 320 may use the blog text language structure template 402 to designate what kind of information is to be expressed, e.g., the height of the tower. The blog text generation module 320 may use the knowledge item 404 to designate specific information that is to be expressed, e.g., the fact that the tower is 30 meters tall. Further, the blog text generation module 320 may use the corpus 406 to designate a sentence structure for expressing the information, e.g., the [subject] is [height value] meters high. As a result, the blog text generation module 320 may generate a blog entry for the particular POI that states, "The tower is 30 meters high."

In various embodiments, the NLG algorithm implemented by the blog text generation module 320 to generate each blog entry may include several stages, such as a text planning stage, a sentence planning stage, and a linguistic realization stage. During the text planning stage, the blog text generation module 320 may use a language structure template, such as the language structure template 402. As shown, the language structure template 402 may include two fields, a matching domain 408 and a semantic domain 410. The matching domain 408 may include two properties: subject type property 412 and affection variable property 414. The semantic domain 410 may contain a list of messages in abstract form, such as the message 416, which describe a series of meanings and information. In other words, each message may be used to describe a single sememe, i.e., piece of information. In various embodiments, each of the messages may include properties such as entities, concepts, and relations. For example, the message 416 may include the entity properties 418 and the relation property 420.

The blog text generation module 320 may use the subject type property 412 and the affection variable property 414 of the matching domain 408 as keywords to select knowledge items from a plurality of knowledge items that are associated with a POI. Each of the knowledge items that are associated with a POI may hold a piece of information for a particular aspect of the POI. The information may range from neutral data related to the POI (e.g., historical facts, statistics, environment information, etc.) to subjective descriptions or opinions, which may be positive or negative, regarding the POI. The knowledge items may be stored in the data store 328 and updated, which may include the edit, deletion or the addition of one or more knowledge items.

For example, the value of subject type property 412 (e.g., building) of the matching domain 408 may match a value of a subject type property field 422 (e.g., building) that is in the matching domain 424 of the knowledge item 404. Likewise, a value of the affection variable property 414 (e.g., neutral) of the matching domain 408 may match a value of the affection variable property 426 (e.g., neutral) in the matching domain 424. Thus, the blog text generation module 320 may assign the values in the property domain 428 (e.g., elements 430 and 432) to the corresponding entity properties 418 that is in the message 416 of the language structure template 402. Nevertheless, it will be appreciated that if the value of the affection variable property 414 of the matching domain 408 had been positive or negative, the blog text generation module 320 may have paired the language structure template 402 to a different corresponding knowledge item with a matching affection variable property value.

The blog text generation module 320 may use a corpus, such as the corpus 406, to perform the sentence planning and linguistic realization stages of NLG, based on a language structure template and one or more knowledge items. Thus, a corpus may provide a universal expression for a certain piece of information, i.e., a sememe.

As shown in FIG. 4, the corpus 406 may include a matching domain 434 and a semantic domain 436. The matching domain 434 may include a relations property 438 that holds a value (e.g., identity) that matches the relations property 420 value (e.g., identity) of the message 416 in the language structure template 402. Further, the matching domain 434 may also include an affection variable property 440 with a value (e.g., neutral) that also matches the value of the affection variable property 414 (e.g., neutral) in the language structure template 402. The semantic domain 436 may also include an expression that holds a sentence or phrase structure with incomplete parts (e.g., the [subject] is [height] high).

Thus, from the above descriptions, the blog text generation module 320 may use each knowledge item to determine the nature of the information to be expressed, a language structure template to determine what information is to be expressed, and a corpus to determine how the information is to be expression. Accordingly, in an example in which the language template structure 402, the knowledge item 404, and the corpus 406 were selected for a particular visited POI based on an affection rating set by the user (e.g., neutral), the blog text generation module 320 may generate a sentence that states, "The tower is 30 meters high."

However, in other instances, given a different set of language components that are associated with other affection ratings, the blog text generation module 320 may also generate sentences that state, "the tower is dilapidated", which may correspond to a negative affection rating, or "the tower is resilient", which may correspond to a positive affection rating. Additionally, it will be appreciated the language template structure 402, the knowledge item 404, and the corpus 406 are merely illustrative, and the text blog generation module 318 may use language structure templates, knowledge items, or corpora that includes additional and/or different multi-dimensional properties. Further, the text blog generation module 318 may use multiple language structure templates, knowledge items, or corpora to provide text content for the construction of a single blog entry for a visited POI. Following each generation, the text blog generation module 318 may store the textual content generated for each visited POI with corresponding media objects 110 (e.g., images, audio objects, video objects, and/or multimedia objects) in the data store 328.

Returning to FIG. 3, the blog publishing module 322 generates a blog that may include multiple blog entries. Following the selection of a photo cluster for each POI and the creation of corresponding text content, the blog publishing module 322 generates a paragraph metadata object for each POI that encompasses the photographs of the relevant cluster and the associated text content. The blog publishing module 322 may also compute a paragraph weight for each paragraph metadata object. The paragraph weight of each paragraph metadata object may represent a relative importance of the paragraph metadata object to the user in relation to one or more other paragraph metadata objects. In at least one embodiment, the paragraph weight of a paragraph may be calculated as follows:

$$Pw = \alpha + \frac{n}{N} + \frac{t}{T} \qquad (1)$$

in which α is a significance weight of the POI that is being described by the paragraph, n is the number of photographs in the paragraph metadata, N is the total number of photographs selected in the image retrieval process, t is an amount of time user remained at the POI, and T is the total time of the trip. In some embodiments, the time d at the POI t and the total time of the trip T may be calculated from captured time and data information extracted from the photographs.

Subsequently, in order to eventually generate a blog, the blog publishing module 322 compiles the paragraph metadata objects into blog metadata. Accordingly, the blog publishing module 322 may further generate blog metadata using one or more paragraph metadata objects and a structure template. The article structure template may be defined to control a structure of a blog, such as the maximal number of photographs in each template, the maximal number of paragraphs, the order of the paragraphs, and/or the like. For instance, an article structure template for a conventional blog may enable the presentation of multiple images with the textual content, while a structure template for a micro-blog may enable the presentation of a single image with the textual content. An example structure template may be written as follows:

```
<ArticleStructure>
    <Order>time</Order>
    <MaxParagraphNum>10</MaxParagraphNum>
    <MaxPhotoNum>3</MaxPhotoNum>
</ArticleStructure>
```

Thus, the particular article structure template that is used may be selected from a plurality of presentation templates based on a blog style selected by the user. As described above, the user may make a style selection via the preference module 142 on the electronic device 102.

Based on the selected structure template, the blog publishing module 322 combines and orders a set of paragraph metadata objects for a plurality of corresponding POIs according to the selected article structure template to create blog metadata. However, if the number of the paragraph metadata objects in the set exceeds the maximum number of paragraphs defined by the structure template (e.g., 10 paragraphs), the blog publishing module 322 may remove one or more paragraph metadata objects from the blog metadata based on paragraph weights.

In some embodiments, the paragraph weight of each paragraph metadata object may be further used by the blog publishing module 322 to dynamically update a blog with blog entries that are published in real-time or near real-time. For example, a blog entry that is generated from a paragraph metadata object with a low paragraph weight may initially be published on a blog web site, but as new paragraph metadata objects with higher paragraph weights are generated when the user travels to additional POIs, the paragraph metadata object with the low paragraph weight may be replaced with one of the new paragraph metadata objects with a higher paragraph weight. In some embodiments, the blog publishing module 322 may prompt the user for confirmation prior to removing the paragraph metadata object with the low paragraph weight.

When the blog content in the form of blog metadata is prepared, the blog publishing module 322 may use a presentation template to represent the blog metadata. The presentation template may be a Hypertext Markup Language (HTML) document that includes custom tags that define the style of the overall blog. The particular presentation template that is used to represent the blog metadata may be selected from a plurality of presentation templates. As described above, the user may make a blog style selection via the preference module 142 on the electronic device 102.

In some embodiments, each presentation template may include one or more paragraph presentation components. Custom tags in each paragraph presentation component may include, for example, [images], [content], and/or the like. For example, each [images] tag may be replaced by one or more photographs and a [content] tag may be replaced by paragraph content. For example, a plurality of photographs may be presented as a collection of non-overlapping images, or as a partially overlapping collage or as a superimposed collage of images. As such, the blog publishing module 322 may use a collage generation algorithm (not shown) to automatically arrange the photographs based on one or more predetermined criteria (e.g., most visually captivating, most visual contrast, least visual contrast, and/or the like).

In other embodiments, each presentation template may also include one or more entry presentation components. Each entry presentation component may include custom tags such as [title], [encoding], [paragraph], and/or the like. For example, the tag [title] may be replaced with a blog title, [encoding] may define a page or page section encoding for the bog, and [paragraph] may be replaced by a list of paragraph metadata objects that are in the blog metadata.

The blog publishing module 322 may further embed non-still image objects, such as audio objects, video objects, and/or multimedia objects, into the photographs. In some embodiments, the blog publishing module 322 may embed a non-still image object into a photograph that is captured immediately prior to the capture of the non-still image object. For example, if the user captures a particular photograph, then subsequently captures an audio clip, the blog publishing module 322 may embed the audio clip into the photograph. In other embodiments, the blog publishing module 322 may embed a non-still image object into a photograph of a plurality of photographs when the photograph has a capture geolocation that is closest to the capture geolocation of the non-still image object.

In additional embodiments, the blog publishing module 322 may embed a non-still image object into a particular photograph selected from a plurality of photographs with a capture time that is closest to the capture initialization time or the capture termination time of the non-still image object. In still other embodiments, the blog publishing module 322 may embed a non-still image into a photograph based on weighted scores for a plurality of photographs, in which each weighted score represents a combination of the time difference between the capture initiation times of a corresponding photograph and the non-still image, as well as location difference between the capture locations of the corresponding photograph and the non-still image object. Accordingly, the blog publishing module 322 may embed the non-still image object into the photograph with the most suitable (e.g., highest) weighted score. The embedding of the non-still image object into a photograph is illustrated in FIG. 5.

Figure 5:
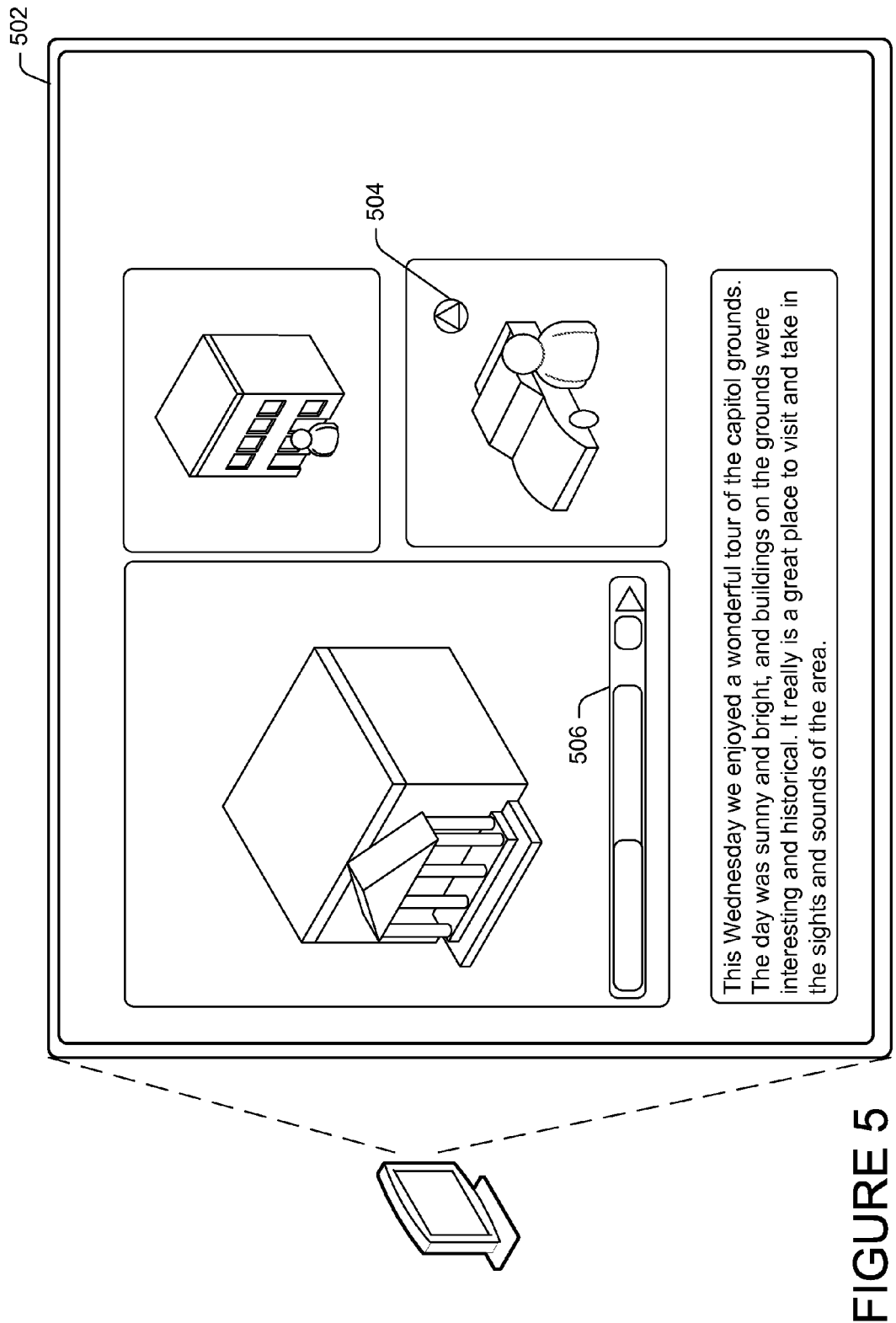
FIG. 5 is an illustration of an example user interface display that depicts a non-still image object embedded into a still image object by an example autonomous blog engine.

FIG. 5 illustrates a user interface that includes a non-still image object embedded into a still image object by the blog publishing module 322. As shown by the example display 502, the blog publishing module 322 may embed each non-still image object into a photograph by inserting a user control that enables at least the playback of the non-still image object. In various instances, the user control may be a button 504 that opens the interface controls 506 of a media player in a separate browser window or session, or the actual interface controls 506 of the media player.

Figure 6:
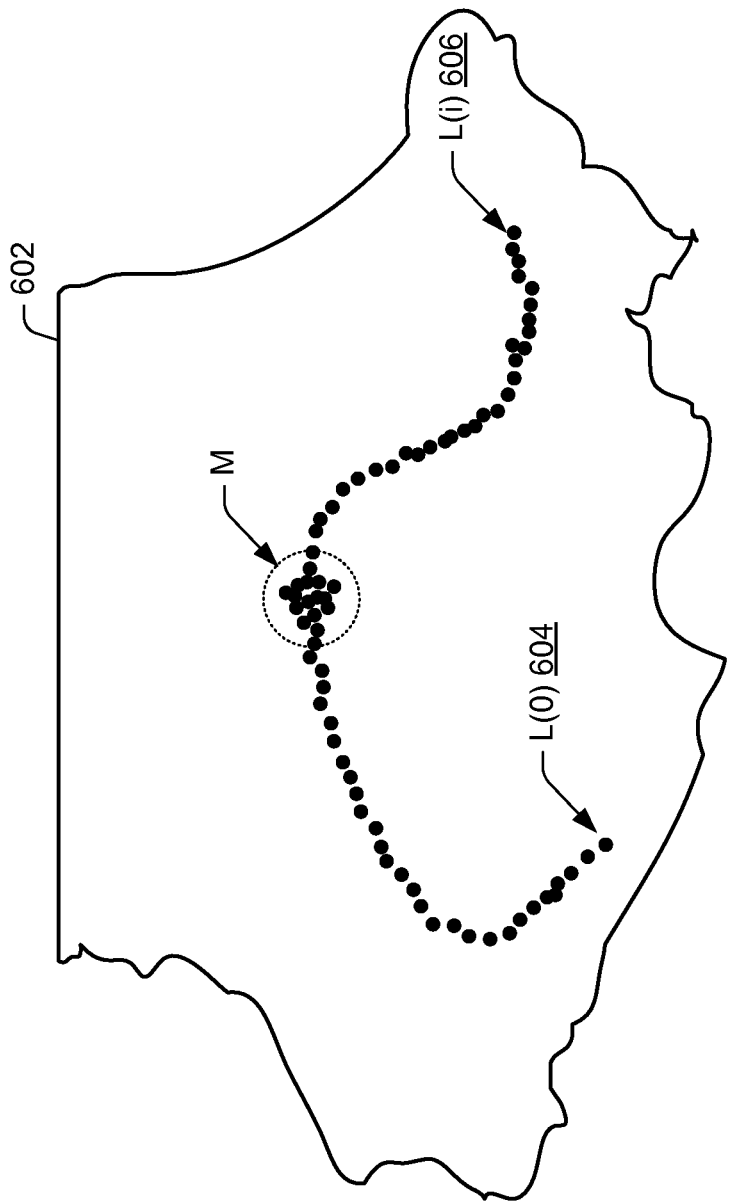
FIG. 6 is a schematic diagram of moving state analysis performed by an example state detection module of an autonomous blog engine to detect a user's movement between places of interest.

The autonomous blog engine 120 may, depending on the user selection provided via the preference module 142, generate and publish a blog for a completed trip session. Alternatively, the autonomous blog engine 120 may publish one or more blog entries in real-time or near real-time as the user moves between POIs. As shown in FIG. 6, real-time or near-time blog entry publishing is dependent upon analysis of a user's moving states and detection of when the user has complete a visit to each POI and is leaving for a new POI.

FIG. 6 is a schematic diagram of an example moving state analysis performed by the state detection module 324 to detect a user's movement between POIs on a terrain 602. Every dot shown may represent a geolocation of the user during a trip that is reported to the autonomous blog engine 120 at a periodic interval by the location module 140 of the electronic device 102. Thus, a location sequence L may be defined to denote the geolocations of the user during the trip, with a first geolocation point denoted by L(0) 604, and a current geolocation point denoted by L(i) 606. The geolocation points in sequence L being added as the user moves during the trip.

In at least one embodiment, the state detection module 324 may compute a weight for each new geolocation point by using the equation (2) as follows:

$$W(i) = \sum_{j=0}^{i-1} \frac{1}{\sigma\sqrt{2\pi}} e^{-\frac{dis(i,j)}{2\sigma^2}} * \text{time}(i, j) \quad (2)$$

in which $dis(i, j)$ is the distance between location points i and j; $\sigma$ is a coefficient, and in which $time(i, j)$ may be defined as follows $$\text{time}(i, j) = \begin{cases} 1, \text{ the time interval between} \\ \quad i \text{ and } j \text{ is less than 10 min} \\ 0, \text{ else} \end{cases} \quad (3)$$

Accordingly, changes in the value of W may reflect the moving state of the electronic device 102, and in turn, the moving state of the user that is carrying the electronic device 102. For example, if W begins to increase to a higher value from an average value, the state detection module 324 may determine that the user is stopped or is advancing slowly. Additionally, if W holds a higher value for a predetermined period of time, the state detection module 324 may determine that the user is staying at one place. Further, when W decreases, the state detection module 324 may determine that the user has left a particular place or is changing the moving state from slowly moving or stop to moving at an average pace. Thus, when W increases from the average value, and then maintains a relatively high value, and then decreases to the average value, the state detection module 324 may designate this sequence of events as M, as the sequence indicates that the user visited a site during the time interval of M. In the event that the user uses the electronic device 102 to capture media objects 110 during M, the state detection module 324 may cause the relevant modules of the autonomous blog engine 120 to find a POI that corresponds to the center of the geolocations belonging to the media objects 110 captured during M. Thus, the eventual blog entry generation for the POI in real-time or near real-time may be initiated by the autonomous blog engine 120 as the engine detects the sequence of events M, when the autonomous blog engine 120 is in automatic mode or semi-automatic mode.

As described above, if the autonomous blog engine 120 is in automatic mode, the blog publishing module 322 may automatically generate and publish each generated blog entry to a blog website that is on the blog server 124 as the user moves between different POIs. Further, if the autonomous blog engine 120 is in semi-automatic mode, the blog publishing module 322 may prompt the user to initiate the generation and publication of each blog entry. Thus, assuming the user initiates a blog entry generation in response to the prompt and the user has also selected an option to review, the blog publishing module 322 may transmit the generated blog entry to the electronic device 102, so that the user of the electronic device 102 may use the edit module 144 to review, edit, or approve the blog entry. Otherwise, if the user selected an option to not review for the semi-automatic mode, then the blog publishing module 322 may publish the blog entry upon user initiation of blog generation and publication without further user review. However, if the autonomous blog engine 120 engine is in manual mode, then the autonomous blog engine 120 may perform data analysis, blog generation, and publication actions as the user moves between different POIs upon being triggered by the user.

Returning to FIG. 3, the user interface module 326 enables an administrator to configure the various modules of the autonomous blog engine 120 via the user interface of the autonomous blog engine 120 described above. In various embodiments, the user interface module 326 may enable the administrator to adjust the predetermined quality thresholds for the received media objects 110. The user interface module 326 may further enable the administrator to add, modify, or delete one more of the templates, knowledge items, and corpora data that are stored in the data store 328, as well as associations between blog styles selectable by the user and corresponding templates.

The data store 328 may store the data that are received from the electronic device 102, such as captured media objects 110, geolocation data 114, blog edits, and/or settings for the autonomous blog engine 120. The data store 328 may also store the various templates, knowledge items, and corpora data that are used by the autonomous blog engine 120, as well as the blogs and blog entries generated by the autonomous blog engine 120. Further, the data store 328 may also store any additional data used by the autonomous blog engine 120, such as various additional intermediate data produced for the generation of blog entries.

Thus, in some embodiments, the autonomous blog engine 120 may be capable of dynamically reformatting and/or re-publishing a generated blog using existing data when the user selects a different blog style or different affection rating for the presentation of the blog or at least a portion of the blog, by once more performing the data analysis and the blog generation described above.

Example Processes

Figure 7:
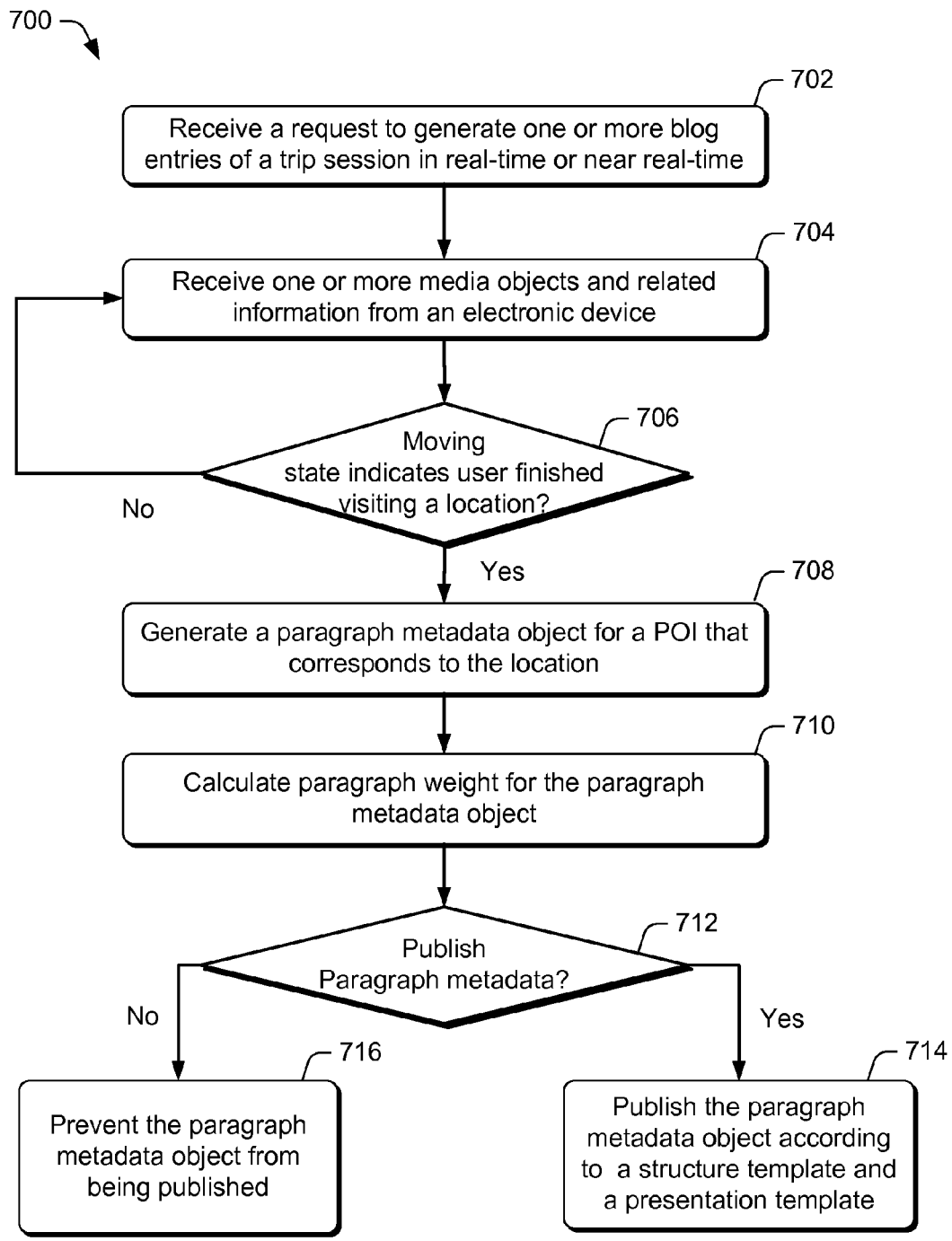
FIG. 7 is a flow diagram of an illustrative process to autonomously generate a blog entry for a place of interest in real time or near real-time.
Figure 8:
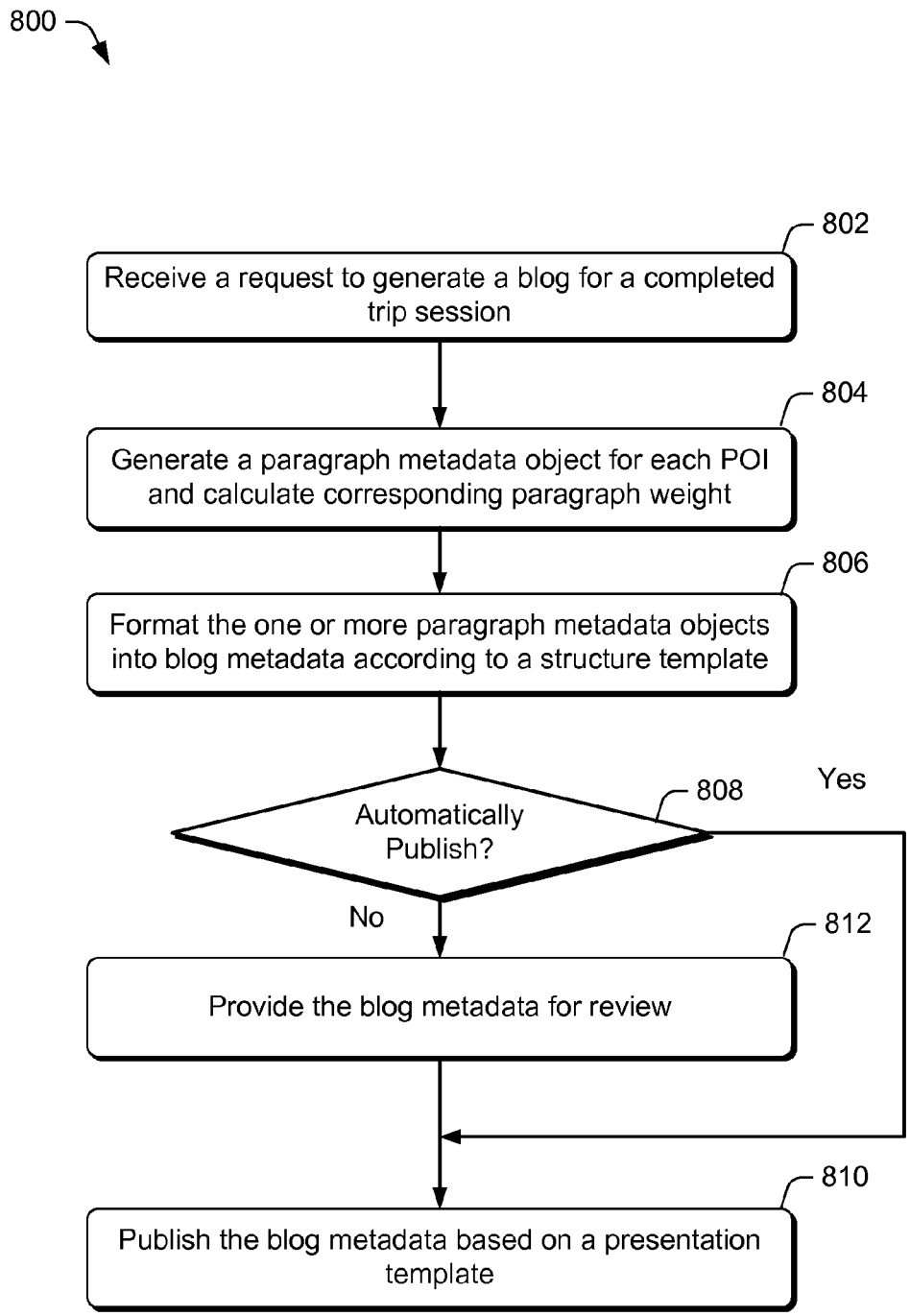
FIG. 8 is a flow diagram of an illustrative process to autonomously generate blog entries for places of interest encountered during a trip session.
Figure 9:
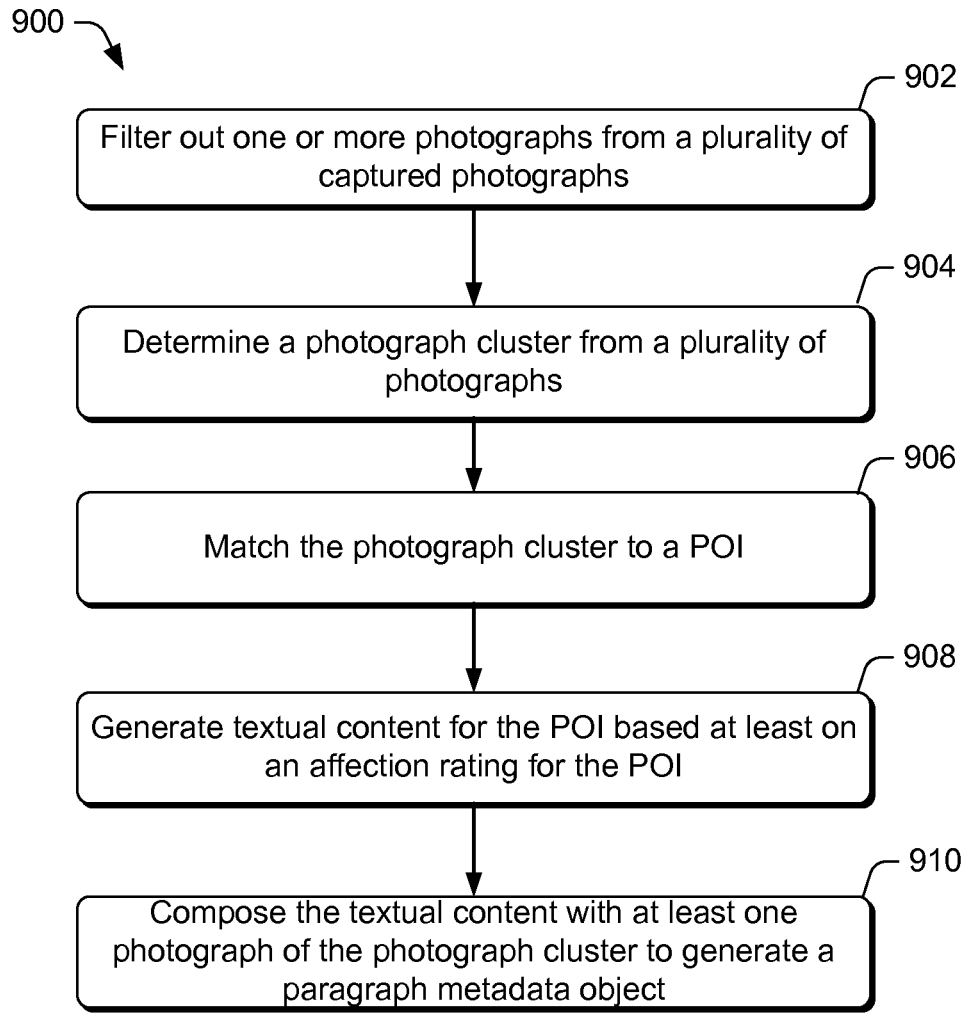
FIG. 9 is a flow diagram of an illustrative process to generate paragraph metadata based on a plurality of captured photographs.

FIGS. 7-9 describe various example processes for implementing autonomous mobile blogging techniques. The example processes are described in the context of the environment 100 of FIG. 1, but are not limited to that environment. The order in which the operations are described in each example process is not to be construed as a limitation, and any number of the described blocks can be combined in any order and/or in parallel to implement each process. Moreover, the blocks in each of the FIGS. 7-9 may be operations that can be implemented in hardware, software, and a combination thereof. In the context of software, the blocks represent computer-executable instructions that, when executed by one or more processors, cause one or more processors to perform the recited operations. Generally, the computer-executable instructions may include routines, programs, objects, components, data structures, and the like that cause particular functions to be performed or particular abstract data types to be implemented.

FIG. 7 is a flow diagram of an illustrative process 700 to autonomously generate a blog entry for a POI in real time or near real-time. At block 702, the autonomous blog engine 120 receives a request to generate one or more blog entries for a trip session in real-time or near real-time time. In various embodiments, the request may be made by the user via the preference module 142 on the electronic device 102 of the user.

At block 704, the autonomous blog engine 120 receives one or more media objects 110 and related information that are captured by the electronic device 102 of the user. The media objects 110 may include, for example, images, video recordings, and/or audio recordings. The related information may include contextual information corresponding to the media objects 110, such as geolocations of the media object captures, times of the media object captures, and/or the like. The related information may further include the periodically queried geolocation of the electronic device 102 from the location module 140. In some embodiments, at least one of the received media objects may have been reformatted by the reformat module 138 on the electronic device 102.

At decision block 706, the state detection module 324 of the autonomous blog engine 120 determines whether the user has finished visiting a location. In various embodiments, the state detection module 324 may make such a determination based on the geolocation information supplied to the autonomous blog engine 120 by the location module 140. For example, the state detection module 324 may determine that the user finished visiting a location when a weight derived from the geolocation information indicates that a moving state of the electronic device 102 increased to a high value from an average value, maintained the high value, and then decreased from the high value to the average value. If state detection module 324 determines that the user has not finished visiting a location ("no" at decision block 706), the process 700 loops back to block 704, so that the autonomous blog engine 120 may continue to receive the media objects 110 and the related information. However, if the state detection module 324 determines that the user has finished visiting a location ("yes" at decision block 706), the process 700 proceeds to block 708.

At block 708, the autonomous blog engine 120 generates a paragraph metadata object for a POI that corresponds to the location that was just visited by the user. In various embodiments, the paragraph metadata object may include data for creating a single paragraph (e.g., a blog entry), in which the single paragraph includes one or more photographs and textual content that is generated for the one or more photographs. At block 710, the blog publishing module 322 of the autonomous blog engine 120 further calculates a paragraph weight for the paragraph metadata object.

At decision block 712, the blog publishing module 322 determines whether the paragraph metadata object is to be published. The determination may be based on a structure template that the user selected to present the paragraph metadata objects and the paragraph weight of the paragraph metadata object. In various embodiments, the structure template may indicate a maximum number of paragraph metadata objects to be included in a blog. Thus, if the maximum number of paragraph metadata objects has not been reached, the blog publishing module 322 may determine that the paragraph metadata object is to be published. However, if the maximum number of paragraph metadata objects has been reached, the blog publishing module 322 may determine that the metadata paragraph metadata object is to be published when the paragraph metadata object does not have the lowest paragraph weight when compared to paragraph weights of paragraph metadata objects that have already been published for the trip session.

Thus, if the blog publishing module 322 determines that the paragraph metadata object is to be published ("yes" at decision block 712), the process 700 proceeds to block 714. At block 714, the blog publishing module 322 publishes the paragraph metadata object according to a structure template and a presentation template that is selected by the user. In various embodiments, the user may select the structure template and the presentation template by selecting a blog style via the preference module 142 of the electronic device 102. Moreover, depending on whether the autonomous blog engine 120 is in automatic mode or semi-automatic mode, the blog publishing module 322 may either automatically publish the paragraph metadata object as a blog entry, or prompt the user to initiate, review and/or edit of the paragraph metadata object prior to publication as a blog entry. The publishing of the paragraph metadata object as a blog entry may occur in real-time or near real-time, such as at least prior to the electronic device 102 and the user reaching a site that follows the POI, as indicated by the state detection module 324. Further, the publishing of the paragraph metadata object may include the embedding of one or more non-still image media objects (e.g., an audio clip, video clip, and/or multimedia clip) into one or more photographs of the paragraph metadata object.

However, if the blog publishing module 322 determines that the paragraph metadata object is not to be published ("no" at decision block 712), the process 700 proceeds to block 716. At block 716, the blog publishing module 322 prevents the paragraph metadata object from being published. In some embodiments, the blog publishing module 322 may accomplish this by removing the paragraph metadata object from the blog metadata that is eventually converted into a blog.

FIG. 8 is a flow diagram of an illustrative process 800 to autonomously generate blog entries for places of interest encountered during a trip session. At block 802, the autonomous blog engine 120 receives a request to generate a blog for a completed trip session. In various embodiments, the request may be made by a user via the preference module 142 on the electronic device 102 of a user.

At block 804, the blog publishing module 322 of the autonomous blog engine 120 generates a paragraph metadata object for each POI traveled to during the trip session. Further, the blog publishing module 322 calculates a paragraph weight for each paragraph metadata object.

At block 806, the blog publishing module 322 formats the one or more paragraph metadata objects into blog metadata according to a structure template. In various embodiments, if the number of the paragraph metadata objects associated with trip session is larger than a maximum paragraph number limit in the structure template, one or more paragraph metadata objects with the lowest paragraph weights may be removed from the blog metadata.

At decision block 808, the autonomous blog engine 120 determines whether blog metadata is to be automatically published. In various embodiments, this determination may be based upon whether a review option or a no review option is currently enabled by the user. Thus, if the autonomous blog engine 120 determines that the blog metadata is to be automatically published since the no review option is enabled ("yes" at decision block 808), the process 800 continues to block 810. At block 810, the blog publishing module 322 publishes the blog metadata to a blog website based on a presentation template previously selected by the user. The blog website may reside on a blog server, such as the blog server 124. The publishing of the blog metadata may further include the embedding of one or more non-still image media objects (e.g., an audio clip, video clip, and/or multimedia clip) into one or more photographs of at least one paragraph metadata object.

However, if the autonomous blog engine 120 determines that the blog metadata is not to be automatically published as the review option is enabled ("no" at decision block 808), the process 800 continues to block 812. At block 812, the blog publishing module 322 provides the blog metadata for review by the user of the electronic device 102. In various embodiments, the user of the electronic device 102 may use the edit module 144 to view and, if desired, edit the blog metadata to change the textual information or arrangement of the photographs that are to be eventually published. Once the user has indicated that the review of the blog metadata is complete or has submitted the blog metadata update to the autonomous blog engine 120, the process 800 loops back to block 810 so that the blog publishing module 322 publishes the blog metadata to a blog website based on a presentation template.

FIG. 9 is a flow diagram of an illustrative process 900 to generate paragraph metadata based on a plurality of captured photographs. The process 900 may further illustrate block 708 of the process 700 and block 804 of the process 800.

At block 902, the media filter module 310 filters out, from a plurality of captured photographs, one or more photographs that do not meet a predetermined quality threshold.

At block 904, the clustering module 312 determines a photograph cluster from a plurality of photographs. In various embodiments, the clustering module 312 may use a fuzzy logic clustering algorithm, such as the fuzzy-c means clustering algorithm, to derive the photograph cluster.

At block 906, the cluster mapping module 314, in conjunction with the mapping verification module 316, matches the photograph cluster to a POI. In various embodiments, the cluster mapping module 314 may preliminarily match a photograph cluster to a plurality of candidate POIs based on physical distances between the geolocation of the cluster center in the photograph cluster and the geolocations of the candidate POIs. Subsequently, the mapping verification module 316 selects a particular candidate POI of the candidate POIs as a match to the photograph cluster when a photograph from the photograph cluster depicts one or more features that match corresponding features depicted in one or more known sample photographs of the particular candidate POI. In various embodiments, the one or more features may be SIFT features.

At block 908, the blog text generation module 320 may use an NLG algorithm to generate textual content for the POI based on an affection rating the user provided for the POI. The generation of the textual content may include the use of one or more language structure templates, one or more knowledge items, and one or more corpora. In various embodiments, the blog text generation module 320 may first select a language structure template (e.g., language structure template 402) for the textual content to be generated for the POI. The blog text generation module 320 may then select one or more knowledge items (e.g., knowledge item 404) with affection ratings that match an affection rating indicated by the user for the POI. Subsequently, the blog text generation module 320 may then assemble the language structure template and the one or more knowledge items into textual content for the POI using a corresponding corpus.

At block 910, the blog publishing module 322 composes the generated textual content with at least one photograph of the photograph cluster to generate a paragraph metadata object. In various embodiments, the generation of the paragraph metadata object may be performed using a structure template selected by the user.

Example Computing Device

Figure 10:
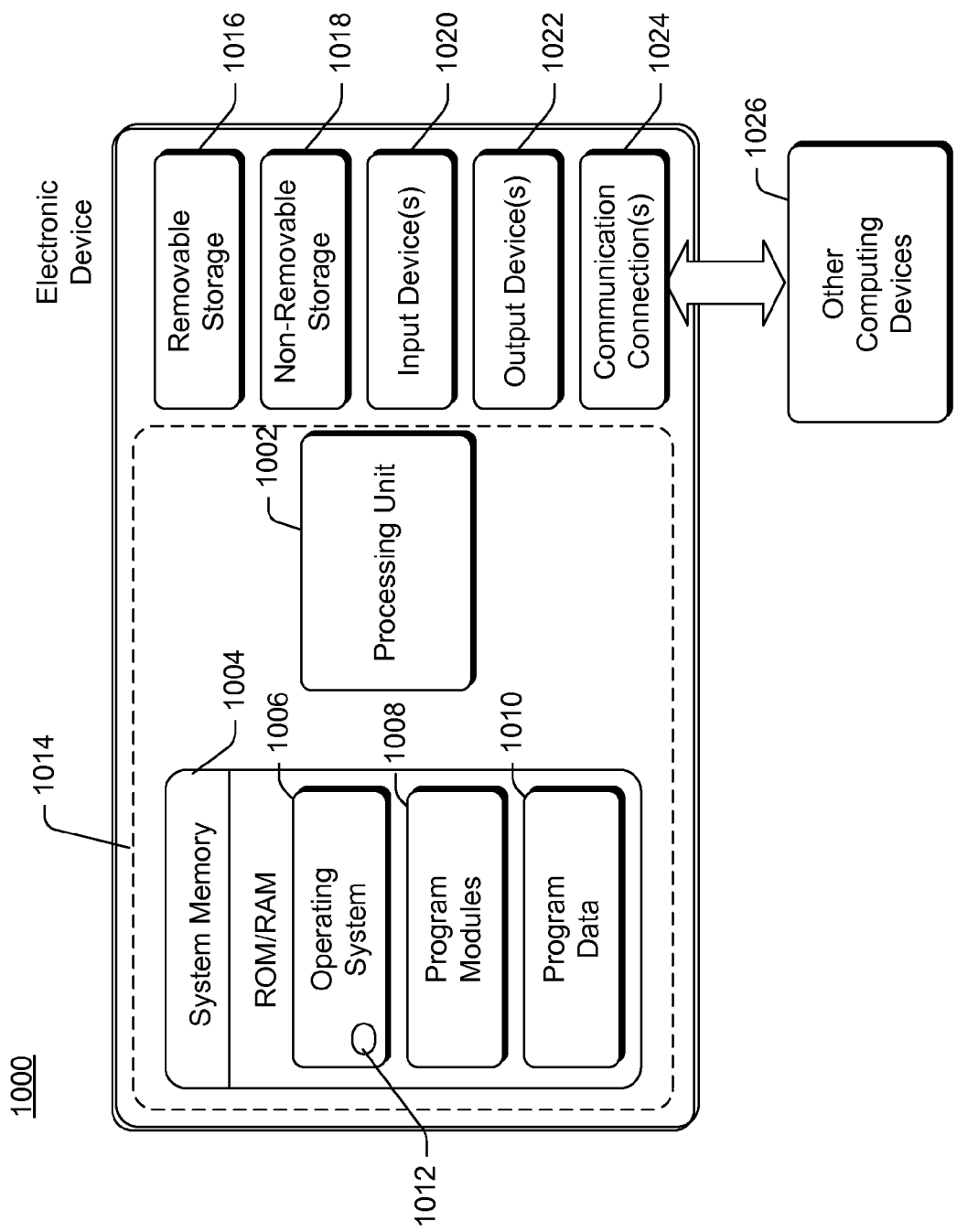
FIG. 10 is a block diagram of an illustrative electronic device that implements various aspects of autonomous mobile blogging.

FIG. 10 illustrates a representative computing device 1000, such as the computing device 102 and/or one or more of the servers 104, which may be used to implement the autonomous mobile blogging techniques. However, it is understood that the techniques and mechanisms described herein may be implemented in other computing devices, systems, and environments. The computing device 1000 shown in FIG. 10 is only one example of a computing device and is not intended to suggest any limitation as to the scope of use or functionality of the computer and network architectures. The computing device 1000 does not have any dependency or requirement relating to any one or combination of components illustrated in the example computing device.

In at least one configuration, computing device 1000 typically includes at least one processing unit 1002 and system memory 1004. Depending on the exact configuration and type of computing device, system memory 1004 may be volatile (such as RAM), non-volatile (such as ROM, flash memory, etc.) or some combination thereof. System memory 1004 may include an operating system 1006, one or more program modules 1008, and may include program data 1010. The operating system 1006 includes a component-based framework 1012 that supports components (including properties and events), objects, inheritance, polymorphism, reflection, and provides an object-oriented component-based application programming interface (API). The computing device 1000 is of a very basic configuration demarcated by a dashed line 1014. Again, a terminal may have fewer components but may interact with a computing device that may have such a basic configuration.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by removable storage 1016 and non-removable storage 1018. Computer storage media may include volatile and nonvolatile, removable and non-removable media implemented in any method or technology for storage of information, such as computer-readable instructions, data structures, program modules, or other data. System memory 1004, removable storage 1016 and non-removable storage 1018 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of the computing device 1000. Computing device 1000 may also have input device(s) 1020 such as keyboard, mouse, pen, voice input device, touch input device, etc. Output device(s) 1022 such as a display, speakers, printer, etc. may also be included.

Computing device 1000 may also contain communication connections 1024 that allow the device to communicate with other computing devices 1026, such as over a network. These networks may include wired networks as well as wireless networks. Communication connections 1024 are some examples of communication media. Communication media may typically be embodied by computer-readable instructions, data structures, program modules, etc, and is separate from the computer storage media.

It will be appreciated that the illustrated computing device 1000 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The implementation of the autonomous mobile blogging techniques described herein may enable users to share events and experiences with other users using a blog with minimal interruption to their normal routine, and without spending considerable time and effort planning and creating the blog.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A computer storage device storing computer-executable instructions that, when executed, cause one or more processors to perform operations comprising:
   receiving a plurality of media objects that are captured by an electronic device during a trip session;
   receiving one or more geolocations of the electronic device at periodic intervals during the trip session;
   determining a physical site visited during the trip session in part by identifying features depicted in the plurality of media objects;
   analyzing the one or more geolocations of the electronic device to determine a movement of the electronic device away from the physical site;
   auto-generating textual content for individual ones of the plurality of media objects that are captured by the electronic device during the trip session, the auto-generated textual content based at least in part on one or more pre-stored knowledge items that include information about the physical site;
   generating paragraph metadata objects for individual ones of the plurality of media objects, the paragraph metadata objects including at least one media object and the auto-generated textual content for the at least one media object;
   calculating paragraph weights based at least in part on the paragraph metadata objects, the paragraph weights associated with and representing a relative importance of individual ones of the paragraph metadata object to a user of the electronic device; and
   publishing a paragraph metadata object including the auto-generated textual content and the at least one media object as a blog entry for a place of interest that corresponds to the physical site when the associated paragraph weight is higher than paragraph weights associated with other paragraph metadata objects.

2. The computer storage device of claim 1, wherein the publishing includes publishing the blog entry on a blog website.

3. The computer storage device of claim 1, the operations further comprising:
   clustering at least some photographs included in the plurality of media objects into a photograph cluster, the photograph cluster having a cluster center that is a mean of corresponding geolocations at which the at least some photographs are captured;
   identifying a plurality of candidate physical sites with nearest physical distances to the cluster center; and
   selecting a candidate physical site from the plurality of candidate physical sites as the place of interest when one or more first features depicted in a photograph of the photograph cluster match one or more second features depicted in a known photograph of the candidate physical site.

4. The computer storage device of claim 3, wherein the blog entry includes at least one photograph from the photograph cluster.

5. The computer storage device of claim 4, wherein the plurality of media objects further include at least one of a video clip, audio clip, or a multimedia clip, and wherein the publishing includes embedding a video clip, audio clip, or a multimedia clip in the at least one photograph.

6. The computer storage device of claim 1, the operations further comprising:
   providing the textual content of the blog entry for display on the electronic device; and
   receiving a modification to the textual content of the blog entry prior to the publishing,
   wherein the publishing includes publishing the blog entry for the place of interest that includes the modification.

7. The computer storage device of claim of 1, the operations further comprising receiving an affection rating from a user of the electronic device regarding the place of interest, wherein the publishing includes publishing the blog entry using the one or more pre-stored knowledge item with information that corresponds to the affection rating.

8. The computer storage device of claim 1, wherein the analyzing includes determining that the electronic device moved away from the physical site when a weight that reflects a moving state of the electronic device increases to a high value from an average value, maintains the high value, and then decreases from the high value to the average value.

9. The computer storage device of claim 1, wherein the publishing includes:
   publishing the paragraph metadata object as the blog entry according to a structure template and a presentation template.

10. The computer storage device of claim 1, wherein the publishing includes publishing the blog entry at least prior to the electronic device reaching another place of interest that follows the place of interest.

11. A method, comprising:
    receiving a plurality of media objects that are captured by an electronic device during a trip session;

clustering a plurality of photographs included in the plurality of media objects into a photograph cluster;

associating a weight with the photograph cluster based on a number of photos associated with the photograph cluster;

determining a place of interest that corresponds to the photograph cluster by comparing one or more first features depicted in the plurality of photographs to one or more second features depicted in known photographs of a plurality of candidate places of interest;

auto-generating textual content for the photograph cluster, the auto-generated textual content based at least in part on one or more pre-stored knowledge items that include information about the place of interest;

generating a paragraph metadata object for the photograph cluster, the paragraph metadata object including at least one of the plurality of photographs included in the plurality of media objects and the auto-generated textual content;

calculating paragraph weights based at least in part on the paragraph metadata objects, the paragraph weights associated with and representing a relative importance of individual ones of the paragraph metadata object to a user of the electronic device; and publishing one of the paragraph metadata object including the at least one photograph and the auto-generated textual content as a blog entry for the place of interest that corresponds to the photograph cluster when the weight associated with the photograph cluster is greater than weights associated with other photograph clusters.

12. The method of claim 11, further comprising:
receiving an affection rating regarding the place of interest;
selecting the one or more pre-stored knowledge items from a plurality of knowledge items based at least on the affection rating; and
generating the textual content to include information in the one or more pre-stored knowledge items.

13. The method of claim 11, wherein the affection rating is one of a positive affection rating that indicates a positive user impression of the place of interest, a neutral affection rating that indicates a neutral user impression of the place of interest, or a negative affection rating that indicates a negative user impression of the place of interest.

14. The method of claim 11, wherein the determining the place of interest includes:
identifying a the plurality of candidate places of interest by comparing physical distances of known candidate places of interest to a cluster center of the photograph cluster, the cluster center being a mean of corresponding geolocations at which the plurality of photographs are captured.

15. The method of claim 11, wherein the media objects further include at least one of a video clip, audio clip, or a multimedia clip, and wherein the publishing includes embedding a video clip, audio clip, or a multimedia clip in the at least one photograph.

16. The method of claim 11, wherein the publishing includes:
creating a paragraph metadata object that includes the textual content and the at least one photograph;
calculating a paragraph weight for the paragraph metadata object that represents a relative importance of the paragraph metadata object; and
publishing the paragraph metadata object as the blog entry when the paragraph weight is higher than an additional paragraph weight of another paragraph metadata object.

17. A system, comprising:
one or more processors; and
a memory that includes components that are executable by the one or more processors, the components comprising:
a device interface component to receive a plurality of media objects that are captured by an electronic device;
a state detection component to determine a movement of the electronic device away from a visited site;
a clustering component to cluster a plurality of photographs included in the media objects into a photograph cluster;
a cluster mapping component to map the photograph cluster to a place of interest that corresponds to the visited site;
a blog text generation module to create a paragraph metadata object from one or more pre-stored knowledge items and the plurality of media objects, the paragraph metadata object including at least one of the plurality of photographs included in the photograph cluster and auto-generated textual content; and
a blog publishing component to calculate a paragraph weight based at least in part on the paragraph metadata object, the paragraph weight representing a relative importance of the paragraph metadata object to a user and to publish the paragraph metadata object as a blog entry about the place of interest, and wherein the blog publishing component publishes the paragraph metadata object including the at least one of the plurality of photographs and the auto-generated textual content when the paragraph weight is higher than an additional paragraph weight of another paragraph metadata object.

18. The system of claim 17, wherein the paragraph metadata object is also based in part on a received affection rating of a user impression, the affection rating being one of a positive affection rating that correlates with a positive user impression of the place of interest, a neutral affection rating that correlates with a neutral user impression of the place of interest, or a negative affection rating that correlates with negative user impression of the place of interest.

19. The system of claim 17, wherein the state detection component determines a movement by analyzing one or more geolocations stored as metadata associated within at least one of the plurality of media objects.

* * * * *